US009258061B2

(12) United States Patent
Olsson et al.

(10) Patent No.: US 9,258,061 B2
(45) Date of Patent: Feb. 9, 2016

(54) INDIVIDUAL INFORMATION IN LOWER AND UPPER OPTICAL SIDEBANDS

(75) Inventors: Bengt-Erik Olsson, Hovas (SE); Jonas Martensson, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 98 days.

(21) Appl. No.: 14/128,082

(22) PCT Filed: Jun. 29, 2011

(86) PCT No.: PCT/EP2011/060911
§ 371 (c)(1),
(2), (4) Date: Dec. 20, 2013

(87) PCT Pub. No.: WO2013/000511
PCT Pub. Date: Jan. 3, 2013

(65) Prior Publication Data
US 2014/0133860 A1 May 15, 2014

(51) Int. Cl.
*H04J 14/00* (2006.01)
*H04B 10/2575* (2013.01)
(Continued)

(52) U.S. Cl.
CPC ........ *H04B 10/2575* (2013.01); *H04B 10/5053* (2013.01); *H04B 10/5165* (2013.01); *H04J 14/0298* (2013.01)

(58) Field of Classification Search
CPC ........................... H04B 10/2575; H04J 14/0298
See application file for complete search history.

(56) References Cited

U.S. PATENT DOCUMENTS 3,755,739 A 8/1973 Okano
2002/0181052 A1 12/2002 Butman et al.
(Continued)

FOREIGN PATENT DOCUMENTS

WO 0167648 A2 9/2001

OTHER PUBLICATIONS

Narasimha, A., et al., "Tandem single sideband modulation scheme for doubling spectral efficiency of analogue fibre links", Electronics Letters, IEE Stevenage, GB, vol. 36, No. 13, Jun. 22, 2000, pp. 1135-1136, XP006015393.
(Continued)

*Primary Examiner* — Dzung Tran
(74) *Attorney, Agent, or Firm* — Rothwell, Figg, Ernst & Manbeck, P.C.

(57) ABSTRACT

This disclosure is directed to an optical transmitter arrangement 100 and a method therein producing a first RF-signal UA1 comprising a first set of data $A_1$ carried by a subcarrier $f_{C1}$, and a second RF-signal UB1 comprising a second set of data $B_1$ carried by the subcarrier $f_{C1}$. Further producing a first transform signal H(UA1) being a Hilbert Transform of the first RF-signal UA1, and a second transform signal −H(UB1) being a Hilbert Transform of the second RF-signal UB1. In addition, modulating the optical carrier $f_{opt}$ with the first RF-signal UA1 and the first transform signal H(UA1), and forming a first sideband $SB_1$ comprising the first set of data $A_1$ at one side of the frequency $f_0$ of the optical carrier $f_{opt}$. In addition, modulating the optical carrier $f_{opt}$ with the second RF-signal UB1 and the second transform signal −H(UB1), and forming a second sideband $SB_2$ comprising the second set of data $B_1$ at the other side of the frequency $f_0$ of the optical carrier $f_{opt}$.

18 Claims, 8 Drawing Sheets

(51) Int. Cl.
*H04B 10/50* (2013.01)
*H04B 10/516* (2013.01)
*H04J 14/02* (2006.01)

(56) References Cited

U.S. PATENT DOCUMENTS

2003/0138181 A1* 7/2003 Davies .............................. 385/3
2007/0292142 A1 12/2007 Hashimoto et al.
2009/0263137 A1* 10/2009 Hossein-Zadeh et al. .... 398/115
2011/0216810 A1* 9/2011 Kumar .......................... 375/146
2011/0249709 A1* 10/2011 Shiue et al. ................... 375/219

OTHER PUBLICATIONS

Narasimha, A., et al., "Maximizing Spectral Utilization in WDM Systems by Microwave Domain Filtering of Tandem Single Sidebands", IEEE Transactions on Microwave Theory and Techniques, IEEE Service Center, Piscataway, NJ, US, vol. 49, No. 10, Oct. 1, 2001, pp. 2042-2047, XP011038446.

* cited by examiner

INDIVIDUAL INFORMATION IN LOWER AND UPPER OPTICAL SIDEBANDS

CROSS-REFERENCE TO RELATED APPLICATION

This application is a 35 U.S.C. §371 National Phase Entry Application from PCT/EP2011/060911, filed Jun. 29, 2011, and designating the United States.

TECHNICAL FIELD

This disclosure relates to optical communication and particularly to a transmitter and a method in the transmitter for allocating individual information in lower and upper sidebands of an optical signal.

BACKGROUND

Today high capacity communication by optical fiber is a common phenomenon. Indeed, optical networks using optical fibers have become more widespread in recent years as they are suitable for communication of various multimedia services and similar being accessed via the broadband signal transmission over the Internet or similar.

The interest has subsequently increased for long and ultra long distance transmission with high spectral efficiency in the optical domain.

A problem related to most electro optical modulators that are used in this connection is that a two sided spectrum around the optical carrier frequency is created when a set of original RF channels are converted into the optical domain. Here, the spectrum of the original RF channels is mirrored around the optical carrier such that the spectrum of the original RF channels is positioned at one side of the optical carrier whereas a copy of the spectrum of the original RF channels is positioned at the other side of the optical carrier.

This creates at least two problems: 1) since two versions of the RF channel are generated this doubles the optical bandwidth compared to the electrical bandwidth required for the original RF channel which reduces the optical spectral efficiency; 2) even in systems that do not require high optical spectral efficiency, transmission of multiple versions of the same signal (e.g. two versions of the RF channel as indicated above) may cause severe signal degradation due to Chromatic Dispersion (CD) if both versions are detected in the receiver. This may e.g. be the case if direct detection techniques are used, e.g. if a square law detector is used. Also, nonlinear effects may cause coupling between closely spaced subcarriers and thus redundant signals, e.g. such as another version of the original RF channel as indicated above, should be avoided in the system.

Some of the problems indicated above may be dealt with by using Optical Single Side-Band (OSSB) techniques, e.g. by removing one half of the optical spectrum by an optical filter. However, OSSB technologies reduce the usable optical bandwidth from the modulator with a factor two (2), since one half of the optical spectrum is removed and left unused. Thus by using optical modulators available today the optical bandwidth that can be covered by a modulator may e.g. be about 50 GHz, even though the modulator as such may cover 100 GHz.

SUMMARY

In view of the above there seems to be a need for an improved scheme for operating electro optical modulators so as to reduce the amount of redundant signals and/or to provide a high spectral efficiency. Due to the high cost, complexity and/or large foot print etc of optical components compared to Radio Frequency (RF) components it is preferred to keep the number of optical components to a minimum, e.g. by replacing optical components with electrical components, e.g. RF-components providing the optical modulator with electrical signals.

At least some of the drawbacks indicated above have been eliminated or mitigated by an embodiment of the present solution providing a method for allocating individual data in lower and upper sidebands in an optical signal to be transmitted, which method comprises the actions of: producing a first RF-signal comprising a first set of data carried by a subcarrier, and a second RF-signal comprising a second set of data carried by the subcarrier; producing a first transform signal being a Hilbert Transform of the first RF-signal, and a second transform signal being a Hilbert Transform of the second RF-signal; modulating the optical carrier with the first RF-signal and the first transform signal, and forming a first sideband comprising the first set of data at one side of the frequency of the optical carrier; and modulating the optical carrier with the second RF-signal and the second transform signal, and forming a second sideband comprising the second set of data at the other side of the frequency of the optical carrier.

At least some of the drawbacks indicated above have also been eliminated or mitigated by another embodiment of the present solution providing an optical transmitter arrangement configured to transmit an optical signal with individual data allocated in lower and upper sidebands. The optical transmitter arrangement comprises a signal generator arrangement configured to operatively produce a first RF-signal comprising a first set of data carried by a subcarrier, and a second RF-signal comprising a second set of data carried by the subcarrier, and a first transform signal being a Hilbert Transform of the first RF-signal, and a second transform signal being a Hilbert Transform of the second RF-signal. In addition, the optical transmitter arrangement comprises an optical modulator arrangement configured to operatively modulate an optical carrier with the first RF-signal and the first transform signal and form a first sideband comprising the first set of data at one side of the frequency of the optical carrier, and modulate the optical carrier with the second RF-signal and the second transform signal and form a second sideband comprising the second set of data at the other side of the frequency of the optical carrier.

It should be emphasized that the term "comprises/comprising" when used in this specification is taken to specify the presence of stated features, integers, steps or components, but does not preclude the presence or addition of one or more other features, integers, steps, components or groups thereof.

It should also be emphasized that the methods defined in the specification or the appended claims may comprise further steps in addition to those mentioned. In addition, the steps mentioned may, without departing from the present solution, be performed in other sequences than those given in the specification or the claims.

Further advantages of the present invention and embodiments thereof will appear from the following detailed description of the solution.

BRIEF DESCRIPTION OF THE DRAWINGS

FIG. 2a is a schematic illustration of an embodiment of the optical transmitter arrangement 100 in FIG. 1 comprising an exemplifying first signal generator arrangement 110a and an exemplifying first optical modulator arrangement 120a;

FIG. 3 is a schematic illustration of some relevant parts of the exemplifying first signal generator arrangement 110a;

DETAILED DESCRIPTION OF EMBODIMENTS

Figure 1:
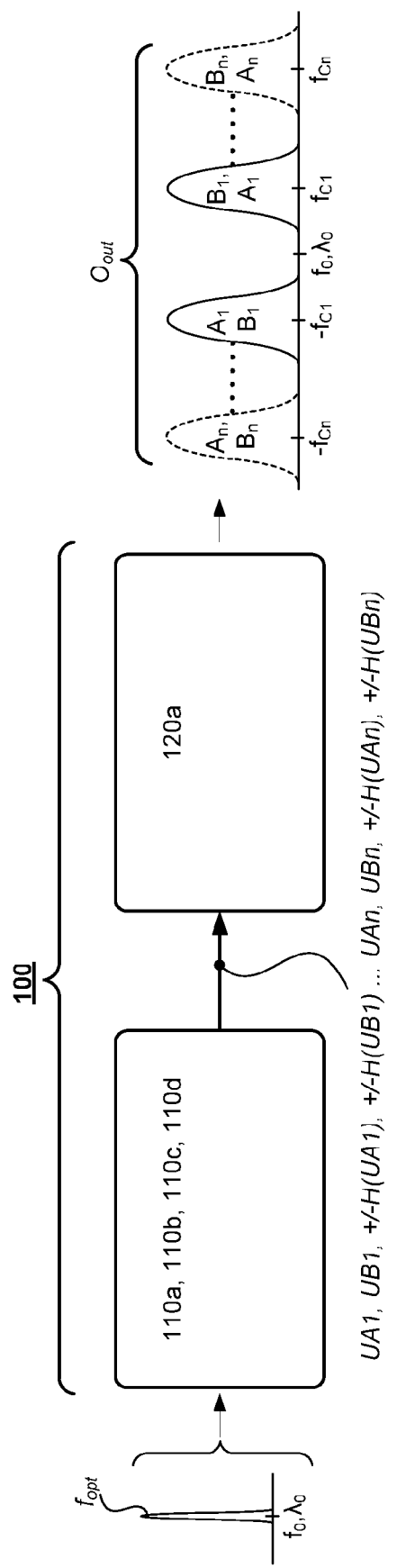
FIG. 1 is a schematic illustration of an exemplifying optical transmitter arrangement 100 according to an embodiment of the present solution.

An exemplifying optical transmitter arrangement 100 according to an embodiment of the present solution is schematically illustrated in FIG. 1. The optical transmitter arrangement 100 is configured to operatively transmit a modulated optical signal, e.g. a Sub Carrier Multiplexing (SCM) signal or similar with a optical carrier $f_{opt}$ at a carrier frequency of $f_0$. It is preferred that the optical carrier $f_{opt}$ suppressed. The modulated optical signal comprises individual data in a first sideband at one side of the frequency $f_0$ of the optical carrier $f_{opt}$ (e.g. at the lower side forming a lower sideband), and individual data in a second sideband at the other side of the frequency $f_0$ of the optical carrier $f_{opt}$ (e.g. at the upper side forming an upper sideband). The optical transmitter arrangement 100 is configured to operatively transmit the modulated optical signal as a light wave through a fiber or similar.

Figure 2A:
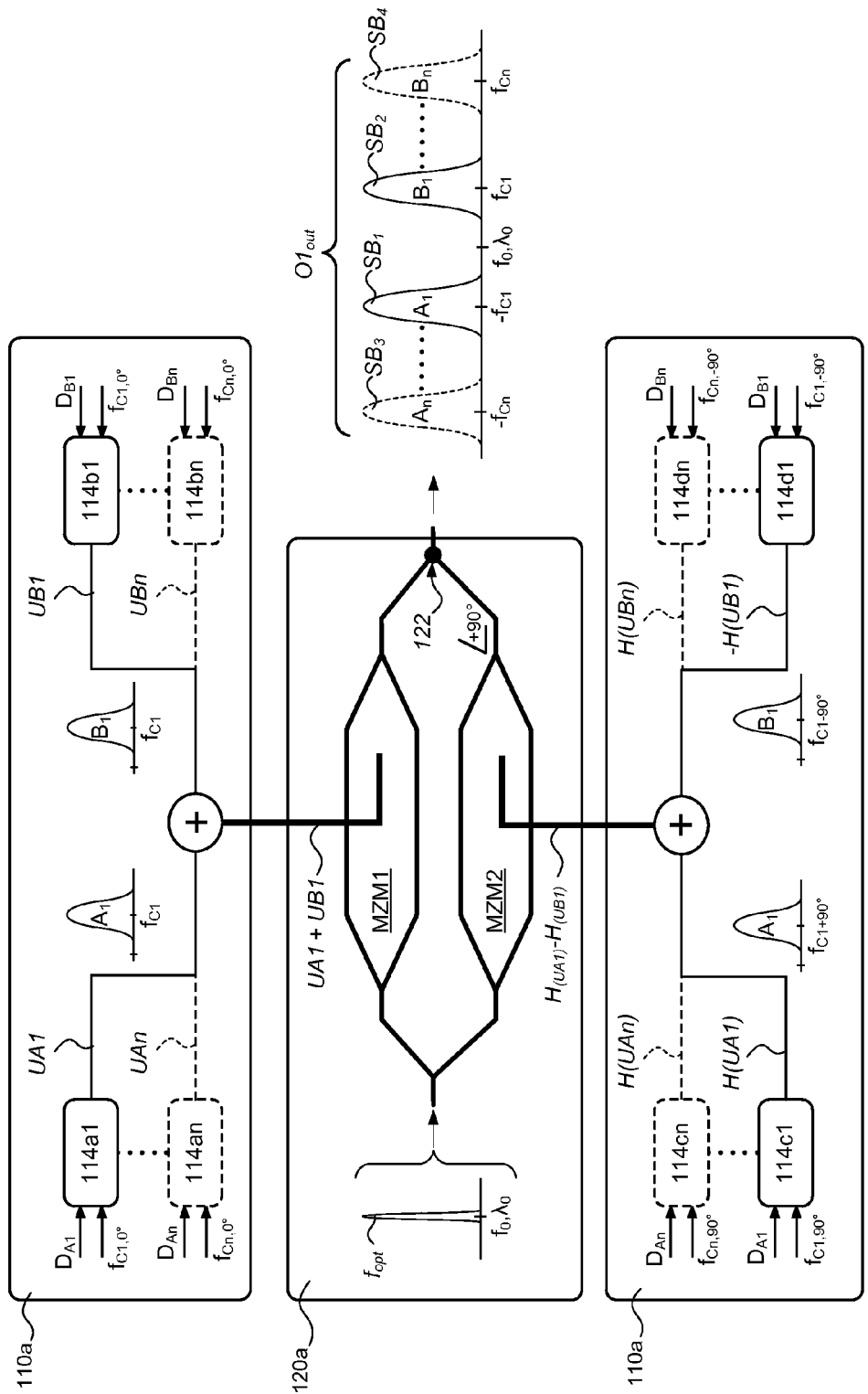

As can be seen in FIG. 1 and FIG. 2a, an embodiment of the optical transmitter arrangement 100 may comprise an exemplifying first signal generator arrangement 110a and an exemplifying first optical modulator arrangement 120a. However, other signal generators and other optical modulator arrangements are clearly conceivable.

The first signal generator arrangement 110a is preferably configured to operatively modulate a subcarrier $f_{C1}$ with a first signal $D_{A1}$ comprising a first set of data $A_1$ to produce a first RF-signal UA1, and to operatively modulate the subcarrier $f_{C1}$ with a second signal $D_{B1}$ comprising a second set of data $B_1$ to produce a second RF-signal UB1. In addition, it is preferred that the signal generator arrangement 110a is configured to produce a first transform signal H(UA1) being a Hilbert Transform of the first RF-signal UA1 and a second transform signal –H(UB1) being a Hilbert Transform of the second RF-signal UB1. It is preferred that the first signal generator modulates both amplitude and phase, e.g. modulates a carrier such that both amplitude and phase of the resulting modulated signal are affected, e.g. modulates the subcarrier $f_{C1}$ with the first signal $D_{A1}$ so as to affect the amplitude and phase of the resulting first RF-signal UA1, and modulates the subcarrier $f_{C1}$ with the second signal $D_{B1}$ so as to affect the amplitude and phase of the resulting second RF-signal UB1.

The subcarrier $f_{C1}$ mentioned above may be any suitable carrier signal, preferably comprising a single frequency. The single frequency of the subcarrier $f_{C1}$ or similar may e.g. be above 10 MHz, or above 100 MHz, or above 1 GHz but preferably below 100 GHz. The subcarrier $f_{C1}$ is preferably configured such that it can be modulated by a set of data or similar, e.g. modulated by a signal comprising a set of data. Preferably, the subcarrier $f_{C1}$ is an electrical signal, i.e. the subcarrier $f_{C1}$ is preferably not an optical signal, though it may be an optical signal in some embodiments. Even though a single subcarrier is mentioned herein it should be emphasized that the present solution may comprise embodiments wherein a plurality of subcarriers is present, each being modulated with a set of data so as to allocate individual information in lower and upper sidebands of an optical signal as described herein. For example, a plurality of RF-signals may be created by various Sub-Carrier Modulation (SCM) schemes utilising a plurality of subcarriers, each being modulated with a set of data so as to allocate individual information in lower and upper sidebands of an optical signal as described herein.

The first set of data $A_1$ and the second set of data $B_1$ mentioned above may be any kind of information that can be converted into a form that is suitable for transmission by an optical transmitter arrangement, e.g. transmitted through an optic fiber or similar. The set of data may e.g. be the information in a data file, in an image, in a video, in a piece of music, in a speech, in a text or similar, or the information in any other item that can be provided to and/or from a suitable communication resource, e.g. such as the Internet or similar.

The first data signal $D_{A1}$ mentioned above may be any signal that represents the first set of data $A_1$, e.g. a baseband signal, e.g. a digital or analogue signal. It is preferred that the first signal $D_{A1}$ is configured such that it can be used to modulate the subcarrier $f_{C1}$ to produce the first RF-signal UA1. Similarly, the second data signal $D_{B1}$ mentioned above may be any signal that represents the second of data $B_1$, e.g. a baseband signal, e.g. a digital or analogue signal. It is preferred that the second signal $D_{B1}$ is configured such that it can be used to modulate the subcarrier $f_{C1}$ to produce the second RF-signal UB1. It is preferred that the first data signal $D_{A1}$ and the second signal $D_{B1}$ have the same or similar properties, e.g. with respect to the information type comprised by the signals, and/or the modulation scheme used for the signals, and/or the frequency content or distribution, and/or power content or distribution or similar, etc.

An RF-signal is typically created by modulating a carrier signal or similar with a set of data, e.g. modulating a carrier signal with a baseband signal comprising a set of data. Thus, as indicated above, the first RF-signal UA may be created by modulating the subcarrier $f_{C1}$ with the first signal $D_{A1}$ comprising a first set of data $A_1$. Similarly, the second RF-signal UB may be created by modulating the subcarrier $f_{C1}$ with the second signal $D_{B1}$ comprising a second set of data $B_1$. The first RF-signal UA1 and the second RF-signal UB1 are typically broadband signals, e.g. the may cover a frequency range (i.e. a frequency band) of more than 500 MHz, or more than 1 GHz, or more than 10 GHz, or more than 50 GHz, or more than 100 GHz, or more than 500 GHz, or more than 1 THz, but less than 100 THz. The first RF-signal UA1 and the second RF-signal UB1 are configured such that they can be used to modulate an optical carrier $f_{opt}$ as will be further elaborated below when discussing the exemplifying modulator arrangement 120a. It is preferred that the frequency range of the RF-signal UA and the RF-signal UB on one hand and the optical carrier $f_{opt}$ on the other has a ratio above 0.1 or above 0.2 or above 0.3 or above 0.4 but below 2. In other words, the frequency range of the RF-signal UA given in Hz divided by the optical carrier $f_{opt}$ given in Hz may be above 0.1 or above 0.2 or above 0.3 or above 0.4 but below 2, and the frequency range of the RF-signal UB given in Hz divided by the optical carrier $f_{opt}$ given in Hz may be above 0.1 or above 0.2 or above 0.3 or above 0.4 but below 2.

The first transform signal H(UA1) mentioned above is preferably produced by phase shifting the subcarrier $f_{C1}$ by 90° and then modulating the phase shifted subcarrier $f_{C1,90}°$ with the first signal $D_{A1}$. The first transform signal H(UA1) is preferably a Hilbert transform of the first RF-signal UA1, preferably a positive Hilbert transform of the first RF-signal UA1. A positive Hilbert transform H(UA1) of the first RF-signal UA1 may be produced by phase shifting the subcarrier $f_{C1}$ by +90°. Similarly, the second transform signal −H(UB1) is preferably produced by phase shifting the subcarrier $f_{C1}$ by 90° and then modulating the phase shifted subcarrier $f_{C1,-90}°$ with the second signal $D_{B1}$. The second transform signal −H(UB1) is preferably a Hilbert transform of the second RF-signal UB1, preferably a negative Hilbert transform of the second RF-signal UB1. A negative Hilbert transform H(UB1) of the second RF-signal UB1 may be produced by phase shifting the subcarrier $f_{C1}$ by −90° and modulating the phase shifted subcarrier $f_{C1,-90}°$ with the second signal $D_{A2}$. The first transform signal H(UA1) and the second transform signal −H(UB1) are configured such that they can be used to modulate the optical carrier $f_{opt}$ as will be further elaborated below when discussing the modulator arrangement 120a.

Phase shifting the subcarrier $f_{C1}$ by 90° as described above implies a phase shift of the subcarrier $f_{C1}$ by +90° or −90° whichever is needed to create the suitable set of transform signals in various embodiments of the present solution. The particular phase shift(s) of the subcarrier $f_{C1}$ needed to create a suitable set of transform signals in a particular embodiment is easily recognised by a skilled person having the benefit of this disclosure. Further guiding embodiments are indicated in FIGS. 2a-2d being discussed below with reference to a given example table.

As indicated above, a Hilbert transform of an RF-signal can be easily produced in a straight forward manner by simply phase shifting the carrier used for the original RF-signal by 90° and then modulate the phase shifted carrier with the same data signal that was used to produce the original RF-signal. It is important to recognise that ordinary narrowband phase shifting arrangement can not be used to phase shift a wideband RF-signal such as the first RF-signal UA1 and the second RF-signal UB1. The properties of various Hilbert transforms are well known to those skilled in the art and they need no detailed description as such. However, it may be mentioned that in mathematics and in signal processing, the Hilbert transform may be seen as a linear operator which takes a function, u(t), and produces a function, H(u)(t), with the same domain. The Hilbert transform is a basic tool in Fourier analysis and it provides a concrete means for producing the conjugate of a given function or Fourier series or similar. Those skilled in the art are well aware of the properties of various Hilbert transforms and the Hilbert transform as such need no detailed explanation.

Figure 3:
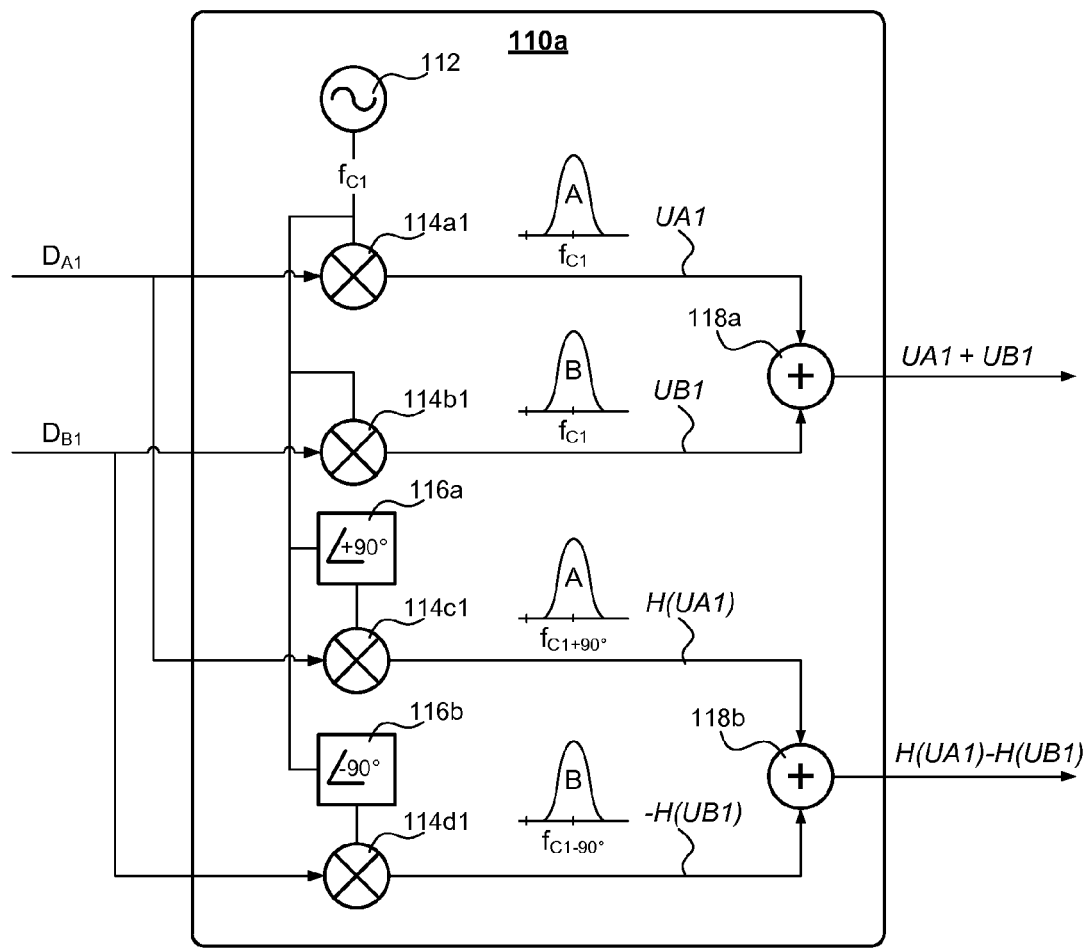

The attention is now directed to FIG. 3 which schematically illustrates some interior parts of the first signal generator arrangement 110a that may be affected when performing the actions and producing the signals etc discussed above.

As can be seen in FIG. 3, the first signal generator arrangement 110a may comprise an oscillator arrangement 112. The oscillator arrangement 112 is configured to operatively provide the subcarrier $f_{C1}$, mentioned above. The oscillator arrangement 112 may be any suitable oscillator that is configured to provide a subcarrier that can be modulated to provide an RF-signal, e.g. such as the first RF-signal UA and the second RF-signal UB. The oscillator arrangement 112 may be a local part of the signal generator 110a or it may be external part provided outside the signal generator 110a, e.g. such that the signal generator 110a receives the subcarrier $f_{C1}$ once it has been generated. Various suitable oscillator arrangements are well known to those skilled in the art and they need no detailed description.

Moreover, the first signal generator 110a may comprise a number of phase shift arrangements. A first phase shift arrangement 116a may be configured to operatively shift the phase of the subcarrier $f_{C1}$ by +90° to create a first shifted subcarrier $f_{C1+90}°$. A second phase shift arrangement 116b may be configured to shift the phase of the subcarrier $f_{C1}$ by −90° to create a second shifted subcarrier $f_{C1-90}°$. It is preferred that the phase shift is the relative phase shift between the subcarrier $f_{C1}$ and the first shifted subcarrier $f_{C1+90}°$ and the second first shifted subcarrier $f_{C1+90}°$. The phase shift arrangements may be any suitable phase shift arrangement that can be used to shift the phase of a carrier signal by +/−90°. It is preferred that the phase shift arrangements 116a, 116b are narrowband devices, since they are only required to phase shift the narrowband subcarrier $f_{C1}$. The phase shift arrangements 116a, 116b may e.g. be configured to phase shift signals within a narrow frequency range of e.g. less than 10 kHz, or less than 100 kHz, or less than 10 MHz, or less than 100 MHz, or less than 200 MHz. The phase shift arrangement may e.g. be a simple delay circuit, e.g. in the form of a first signal path for the original subcarrier $f_{C1}$ and a second path for the phase shifted subcarrier $f_{C1+90}°$ or $f_{C1-90}°$. The second path may be longer or shorter than the first path as required to obtain the wanted phase shift of +90° or −90°. Various suitable phase shift arrangements that can be used to phase shift a carrier signal are well known to those skilled in the art and they need no detailed description.

Moreover, the first signal generator 110a may comprise a number of mixer arrangements configured to mix (i.e. modulate) the subcarrier $f_{C1}$ and/or the shifted subcarrier $f_{C1+90}°$ and/or the shifted subcarrier $f_{C1-90}°$ with a signal comprising a set of data. It is preferred that the mixer arrangements are configured to modulate both amplitude and phase, e.g. modulate a carrier such that both amplitude and phase of the resulting modulated signal are affected, e.g. modulate the subcarrier $f_{C1}$ with a signal so as to affect amplitude and phase of the resulting modulated signal, and/or modulate the shifted subcarrier $f_{C1+90}°$ with a signal so as to affect amplitude and phase of the resulting modulated signal, and/or modulate the shifted subcarrier $f_{C1-90}°$ with a signal so as to affect amplitude and phase of the resulting modulated signal. As can be seen in FIG. 3, a first mixer arrangement 114a1 may be configured to operatively modulate the subcarrier $f_{C1}$ with the first signal $D_{A1}$ comprising the first set of data $A_1$ to produce the first RF-signal UA1. A second mixer arrangement 114b1 may be configured to modulate the subcarrier $f_{C1}$ with the second signal $D_{B1}$ comprising the second set of data $B_1$ to produce the second RF-signal UB1. A third mixer arrangement 114c1 may be configured to modulate the first shifted subcarrier $f_{C1+90}°$ with the first signal $D_{A1}$ comprising a first set of data $A_1$ to produce a first shifted RF-signal H(UA1). A fourth mixer arrangement 114d1 may be configured to modulate the second shifted subcarrier $f_{C1-90}°$ with the second signal $D_{B1}$ comprising the second set of data $B_1$ to produce a second shifted RF-signal −H(UB1). The mixing arrangements 114a1, 114b1, 114c1 and 114d1 may be any suitable mixing arrangement that can be used to modulate a carrier signal with a signal comprising a set of data so as to produce an RF-signal comprising the set of data in question. There are a vast number of mixing arrangements that can be used to modulate a carrier signal with a set of data so as to produce an RF-signal comprising the set of data in question. Such mixing arrangements are well known to those skilled in the art and they need no detailed description.

Moreover, the exemplifying first signal generator 110a as shown in FIG. 3 may comprise two summation arrangements that are configured to operatively summarize the RF-signals. In the embodiment shown in FIG. 2a a first summation arrangement 118a is configured to operatively summarize the first RF-signal UA1 and the second RF-signal UB1 and then provide the sum to the optical modulator arrangement 120a, whereas a second summation arrangement 118b is configured to operatively summarize the first transform signal H(UA1) and the second transform signal –H(UB1) and then provide the sum to the optical modulator arrangement 120a.

However, as indicated in FIGS. 2a-2d being discussed later with reference to the example table, the first summation arrangement 118a may be configured to operatively summarize the first RF-signal UA1 and one of the second RF-signal UB1 or the second transform signal H(UB1) before the resulting sum is provided to the optical modulator 120a to modulate the optical carrier $f_{opt}$. Similarly, seen more general, the second summation arrangement 118b may be configured to operatively summarize the first transform signal H(UA1) and one of the second transform signal –H(UB1) or the second RF-signal UB1 before the resulting sum is provided to the optical modulator 120a to modulate the optical carrier $f_{opt}$. Note that the first transform signal H(UA1) may be positive +H(UA1) or negative –H(UA1) and the second transform signal H(UB1) may be positive +H(UB1) or negative –H(UB1) as required in particular embodiments.

Before we proceed it should be clarified that the scheme performed by the exemplifying first signal generator 110a may be extended to an arbitrary number of n subcarriers $f_{Cn}$ using an arbitrary number n of mixers arrangement 114an, 114bn, 114cn and 114dn, e.g. producing a Sub-Carrier Modulation (SCM) signal $O1_{out}$ as indicated by dashed lines in FIG. 2a. Here, the dashed mixer arrangement 114an corresponds to the first mixer arrangement 114a1, the dashed mixer arrangement 114bn corresponds to the second mixer arrangement 114b1, the dashed mixer arrangement 114cn corresponds to the third mixer arrangement 114c1, and the dashed mixer arrangement 114dn corresponds to the fourth mixer arrangement 114d1. Thus, as indicated in FIG. 2a, there may be at least one additional subcarrier $f_{Cn}$ that is modulated in the same or similar manner as the first subcarrier $f_{C1}$. In other words, the additional subcarrier $f_{Cn}$ may be modulated with a first additional signal $D_{An}$ comprising a first additional set of data $A_n$ to form a first additional RF-signal UAn, and with a second additional signal $D_{Bn}$ comprising a second additional set of data $B_n$ to form a second additional RF-signal UBn. Moreover, a first additional transform signal H(UAn) being a Hilbert Transform of the first additional RF-signal UAn and a second additional transform signal H(UBn) being a Hilbert Transform of the second additional RF-signal UBn may be produced in the same or similar manner as the first transform signal H(UA1) and the second transform signal H(UB1) respectively.

Here, the additional subcarrier $f_{Cn}$ corresponds to the first subcarrier $f_{C1}$, the first additional signal $D_{An}$ corresponds to the first signal $D_{A1}$, the first additional set of data An corresponds to the first set of data A1, and the first additional RF-signal UAn corresponds to the first RF-signal UA1. Similarly, the second additional signal $D_{Bn}$ corresponds to the second signal $D_{B1}$, the second additional set of data Bn corresponds to the second set of data B1, the second additional RF-signal UBn corresponds to the second RF-signal UB1, the first additional transform signal H(UAn) corresponds to the first transform signal H(UA1), and the second additional transform signal H(UBn) corresponds to the second transform signal H(UB1).

From the above it follows that the optical carrier $f_{opt}$ may be additionally modulated with the first additional RF-signal UAn and with the first additional transform signal H(UAn) to form a first additional sideband $SB_3$ comprising the first additional set of data $A_n$ at one side of the frequency $f_0$ of the optical carrier $f_{opt}$, and modulated with the second additional RF-signal UBn and the second transform signal H(UBn) to form a second additional sideband $SB_4$ comprising the second additional set of data $B_n$ at the other side of the frequency $f_0$ of the optical carrier $f_{opt}$.

It should be added that the first summation arrangement 118a may be additionally configured to operatively summarize the first additional RF-signal UAn and one of the second additional RF-signal UBn or the second additional transform signal H(UBn) before the resulting sum is provided to the optical modulator arrangement 120a to modulate the optical carrier $f_{opt}$. Similarly, the second summation arrangement 118b may be additionally configured to operatively summarize the first additional transform signal H(UAn) and one of the second additional transform signal –H(UBn) or the second RF-signal UBn before the resulting sum is provided to the optical modulator arrangement 120a to modulate the optical carrier $f_{opt}$. Note that the first additional transform signal H(UAn) may be positive +H(UAn) or negative –H(UAn) and the second additional transform signal H(UBn) may be positive +H(UBn) or negative –H(UBn) as required in particular embodiments.

Before we proceed it should be clarified that one or several steps of the modulation and/or generation or similar occurring in a signal generator arrangement 110a as described above may be performed in the analogue domain and/or in the digital domain. Naturally, there may be a need for one or several Analogue to Digital Converters (ADC) and/or Digital to Analogue Converters (DAC) to convert between the analogue and/or digital domain at different stages of the modulation and/or generation.

It should also be clarified that the first RF-signal UA1, the second RF-signal UB1, the first transform signal H(UA1) the second transform signal –H(UB1) and their corresponding counterparts are preferably electrical signals produced by electrical components, i.e. they are preferably not optical signals produced by optical components. In other words, the signal generator arrangement 110a is preferably configured to operatively produce the first RF-signal UA1, the second RF-signal UB1, the first transform signal +/–H(UA1), and the second transform signal +/–H(UB1) as electrical signals. Due to the high cost, complexity and/or large foot print etc of optical components compared to electrical components such as Radio Frequency (RF) components it is advantageous to replace optical components with RF-components supplying an electro optical modulator with electrical signals.

The attention is now directed to the exemplifying optical modulator arrangement 120a that is schematically illustrated in FIG. 2a. The optical modulator 120a is configured to modulate the optical carrier $f_{opt}$ with the first RF-signal UA1 and the first transform signal H(UA1) to form a first sideband $SB_1$ comprising the first set of data $A_1$ at one side of the frequency $f_0$ of the optical carrier $f_{opt}$, e.g. at the lower side of the frequency $f_0$ forming a lower sideband. The optical modulator 120a is also configured to modulate the optical carrier $f_{opt}$ with the second RF-signal UB1 and the second transform signal –H(UB1) to form a second sideband $SB_2$ comprising the second set of data $B_1$ at the other side of the frequency $f_0$ of the optical carrier $f_{opt}$, e.g. at the upper side of the frequency $f_0$ forming an upper sideband.

Thus, the signal generator arrangement 110a and the optical modulator 120a in FIG. 2a may produce an optical signal $O1_{out}$ with individual data allocated in the lower sideband SB1 and in the upper sideband SB2. In fact, this can be compared to two Optical Single SideBand (OSSB) schemes. Here, one OSSB scheme produces a first sideband $SB_1$ comprising the first set of data $A_1$ at one side of the frequency $f_0$ of the optical carrier $f_{opt}$, whereas the other OSSB scheme produces a second sideband $SB_2$ comprising the second set of data $B_1$ at the other side of the frequency $f_0$ of the optical carrier $f_{opt}$. This clearly provides a higher spectral efficiency compared to a single OSSB scheme which leaves either the lower sideband or the upper sideband unused.

The optical carrier $f_{opt}$ mentioned above may be any suitable optical carrier signal, preferably comprising a single frequency. The single frequency of the optical carrier $f_{opt}$ may e.g. be above 1 THz but preferably below 500 THz or below 700 THz. The optical carrier $f_{opt}$ is preferably configured such that it can be modulated by a set of RF-signals, e.g. such as the RF-signals UA1, UB1, H(UA1), H(UB1). The source providing the optical carrier $f_{opt}$ may be a local part of the optical modulation arrangement 120a or it may be an external part provided outside the optical modulation arrangement 120a, e.g. such that the optical modulation arrangement 120a receives the optical carrier $f_{opt}$ once it has been generated. Various suitable sources for providing the optical carrier $f_{opt}$, e.g. various laser sources or similar, are well known to those skilled in the art and they need no detailed description.

It is preferred that the optical modulator arrangement 120a is an electro optical modulator arrangement configured to receive electrical RF-signals that can be used to modulate the optical carrier signal $f_{opt}$.

The optical modulator arrangement 120a is preferably an optical I/Q-modulator configured to operatively modulate the optical carrier $f_{opt}$ in-phase with a first set of RF-signals and in quadrature with a second set of RF-signals. In other words, the first set of RF-signals modulates the optical carrier $f_{opt}$ in-phase whereas the second set of RF-signals modulates the optical carrier $f_{opt}$ in quadrature. Thus, the first set of RF-signals and the second set of RF-signals modulate the optical carrier $f_{opt}$ with a phase difference of 90°.

Generally, it is preferred that the optical modulator arrangement 120a is configured to operatively modulate the optical carrier $f_{opt}$ with the first RF-signal UA1 and the first transform signal H(UA1) such that the first RF-signal UA1 and the first transform signal H(UA1) modulates the optical carrier $f_{opt}$ in quadrature with respect to each other to form the first sideband $SB_1$ at one side of the frequency $f_0$ of the optical carrier $f_{opt}$. In other words, the first RF-signal UA1 and the first transform signal H(UA1) modulate the optical carrier $f_{opt}$ with a phase difference of 90°. Similarly it is preferred that the optical modulator arrangement 120a is configured to operatively modulate the second RF-signal UB1 and the second transform signal −H(UB1) such that the second RF-signal UB1 and the second transform signal −H(UB1) modulates the optical carrier $f_{opt}$ in quadrature with respect to each other to form the second sideband $SB_2$ at the other side of the frequency $f_0$ of the optical carrier $f_{opt}$. In other words, the second RF-signal UB1 and the second transform signal H(UB1) modulate the optical carrier $f_{opt}$ with a phase difference of 90°.

In the particular embodiments shown in FIGS. 2a-2d, it is preferred that the optical modulator arrangement 120a is configured to operatively modulate the optical carrier $f_{opt}$ in-phase with the first RF-signal UA1 and one of the second RF-signal UB1 or the second transform signal H(UB1), and to modulate the optical carrier $f_{opt}$ in quadrature with the first transform signal H(UA1) and one of the second transform signal −H(UB1) or the second RF-signal UB1.

A skilled person having the benefit of this disclosure realizes that the present solution may comprise embodiments utilizing several different modulation schemes for allocating individual information in lower and upper sidebands. For example, the sign of the transform signals needed to create a suitable set of sidebands SB1, SB2 in a particular embodiment is easily recognised by a skilled person having the benefit of this disclosure.

A few guiding embodiments are elaborated in some detail below with reference to the example table. The example table gives four (4) exemplifying alternatives that are applicable to some embodiments of the optical transmitter arrangement 100 comprising a generator arrangement and an optical modulator arrangement. As indicated in the example table, the sidebands SB1 and SB2 may comprise different sets of data A1 or B1, e.g. depending on whether the transform signals H(UA1), H(UB1) are negative or positive, and depending on whether the transform signals +/−H(UA1), +/−H(UB1) and the RF-signals UA1, UB1 are modulated in quadrature (+90°) or in-phase (0°). It should be emphasised that the present solution is not limited to the exemplifying alternatives given in the example table. On the contrary, a skilled person having the benefit of this disclosure realizes that other embodiments may utilize other alternatives or similar without departing from the present solution.

|   | SB1 | SB2 | +90° | +90° | 0° | 0° |
|---|---|---|---|---|---|---|
| 1 | A1 | B1 | H(UA1) | −H(UB1) | UA1 | UB1 |
| 2 | B1 | A1 | −H(UA1) | H(UB1) | UA1 | UB1 |
| 3 | A1 | B1 | H(UA1) | UB1 | UA1 | H(UB1) |
| 4 | B1 | A1 | −H(UA1) | UB1 | UA1 | −H(UB1) |

In alternative 1, which is schematically outlined in FIG. 2a, the optical carrier $f_{opt}$ is modulated in-phase with the first RF-signal UA1 and in quadrature with the first transform signal H(UA1) representing a positive Hilbert transform of the first RF-signal UA1 so as to form a first lower sideband SB1 comprising the first set of data $A_1$. In addition, the optical carrier $f_{opt}$ is modulated in-phase with the second RF-signal UB1 and in quadrature with the second transform signal −H(UB1) representing a negative Hilbert transform of the second RF-signal UB1 so as to form a second upper sideband $SB_2$ comprising the second set of data $B_1$.

Figure 2B:
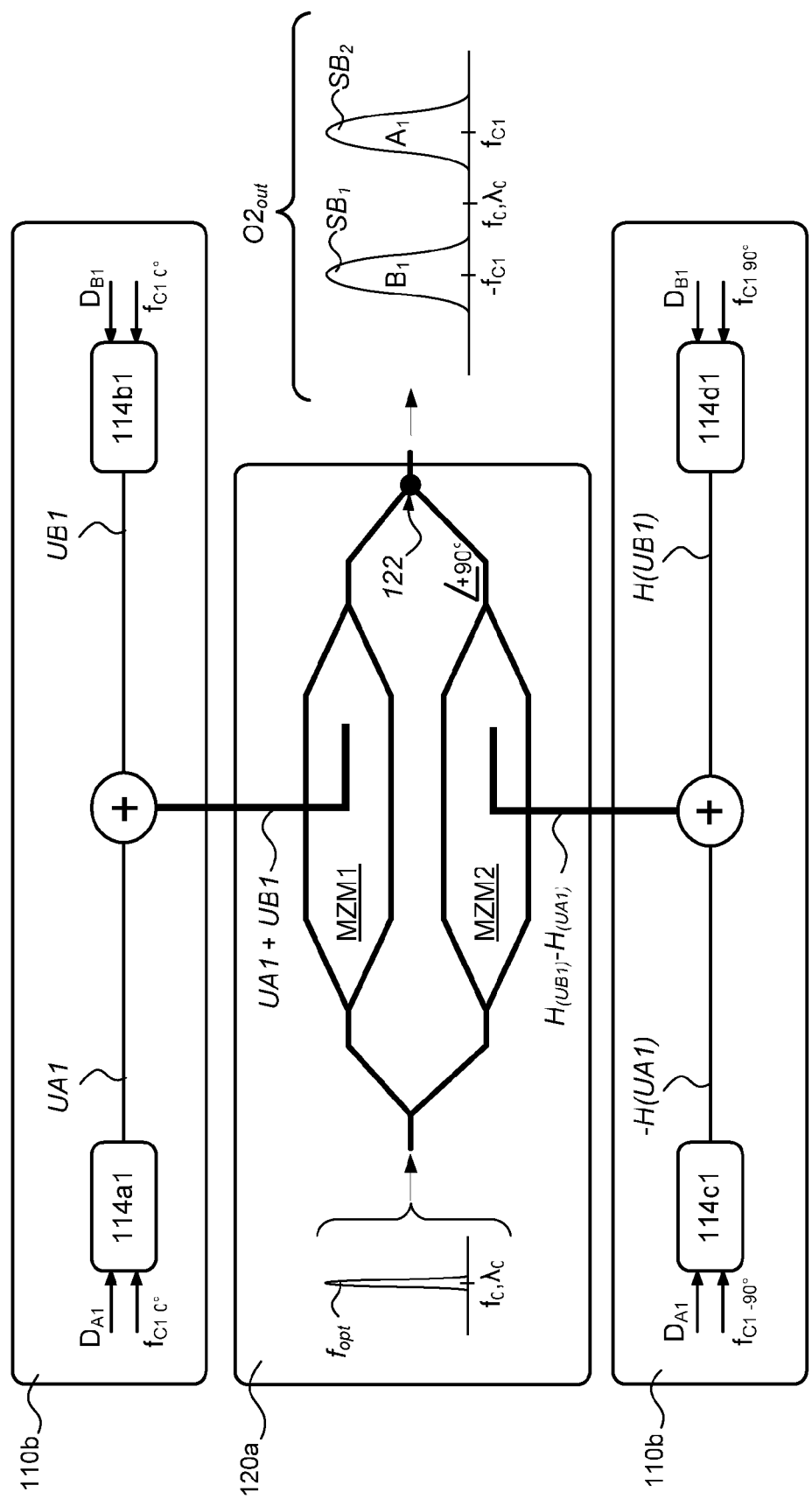
FIG. 2b is a schematic illustration of a first alternative signal generator arrangement 110b and the optical modulator arrangement 120a operating under a first alternative allocation scheme.

In alternative 2, which is schematically outlined in FIG. 2b, the optical carrier $f_{opt}$ is modulated in-phase with the first RF-signal UA1 and in quadrature with a first transform signal −H(UA1) representing a negative Hilbert transform of the first RF-signal UA so as to form an upper sideband SB2 comprising the first set of data $A_1$. In addition, the optical carrier $f_{opt}$ is modulated in-phase with the second RF-signal UB1 and in quadrature with a second transform signal H(UB1) representing a positive Hilbert transform of the second RF-signal UB1 so as to form a lower sideband SB1 comprising the second set of data $B_1$. Here, the set of data in the two sidebands of the optical output signal $O2_{out}$ have changed place compared to alternative 1. To accomplish this, a first alternative signal generator arrangement 110b is used in alternative 2. The first alternative signal generator arrangement 110b is the same as the first signal generator arrangement 110a, except that the phase of the subcarrier $f_{C1}$ provided to the third mixer arrangement 114c1 and the fourth mixer arrangement 114d1 has been changed as indicated in FIG. 2b.

Figure 2C:
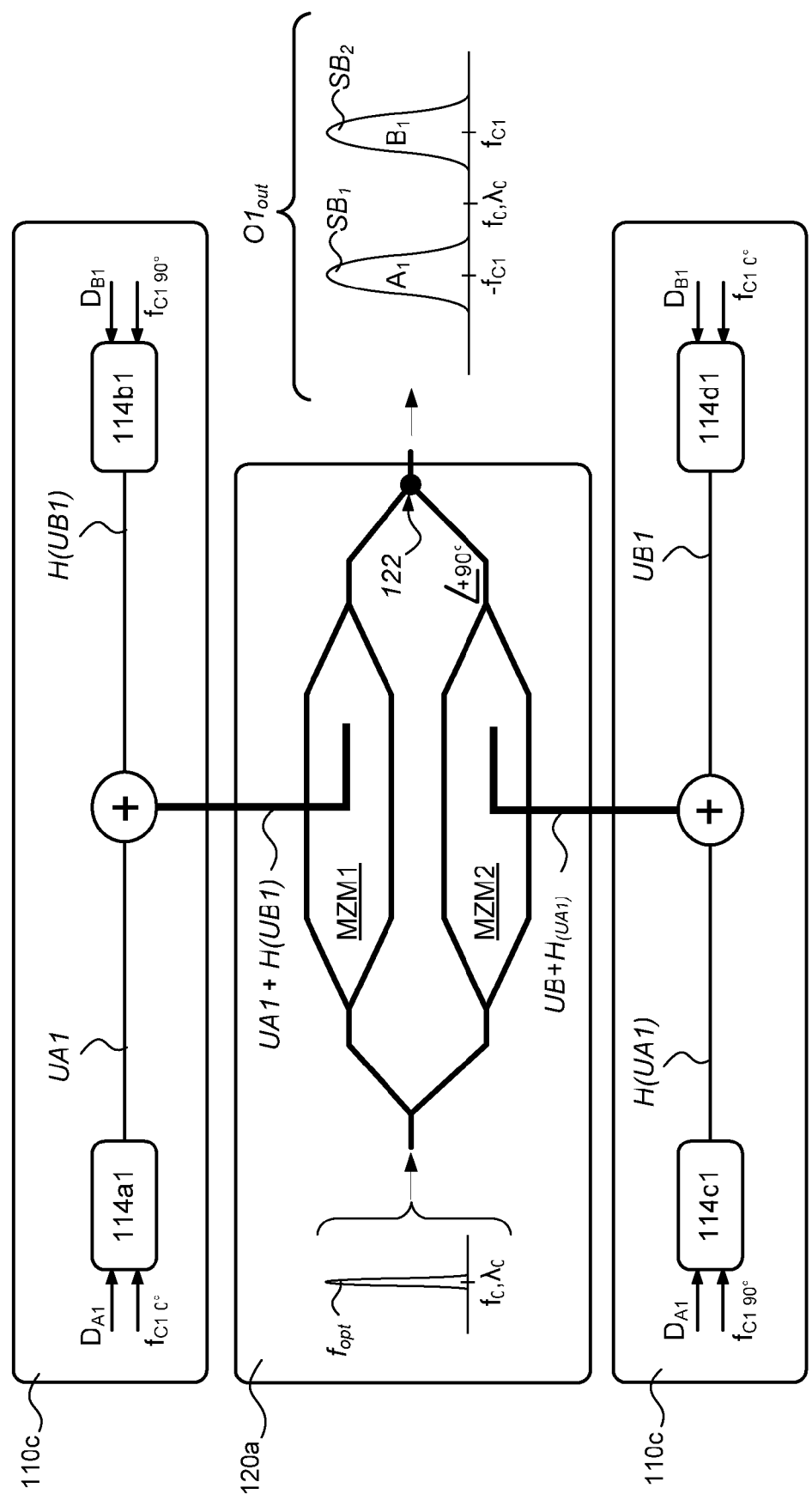
FIG. 2c is a schematic illustration of a second alternative signal generator arrangement 110c and the optical modulator arrangement 120a operating under a second alternative allocation scheme.

In alternative 3, which is schematically outlined in FIG. 2c, the optical carrier $f_{opt}$ is modulated in-phase with the first RF-signal UA1 and in quadrature with a first transform signal H(UA1) representing a positive Hilbert transform of the first RF-signal UA1 so as to form a lower sideband $SB_1$ comprising the first set of data $A_1$. In addition, the optical carrier $f_{opt}$ is modulated in quadrature with the second RF-signal UB1 and in-phase with a second transform signal H(UB1) representing a positive Hilbert transform of the second RF-signal UB1 so as to form an upper sideband $SB_2$ comprising the second set of data $B_1$. Here, the set of data in the two sidebands of the optical output signal $O1_{out}$ is the same as in alternative 1. To accomplish this, a second alternative signal generator arrangement 110c is used in alternative 3. The second alternative signal generator arrangement 110c is the same as the first signal generator arrangement 110a, except that the phase of the subcarrier $f_{C1}$ provided to the second mixer arrangement 114b1 and the fourth mixer arrangement 114d1 has been changed as indicated in FIG. 2c.

Figure 2D:
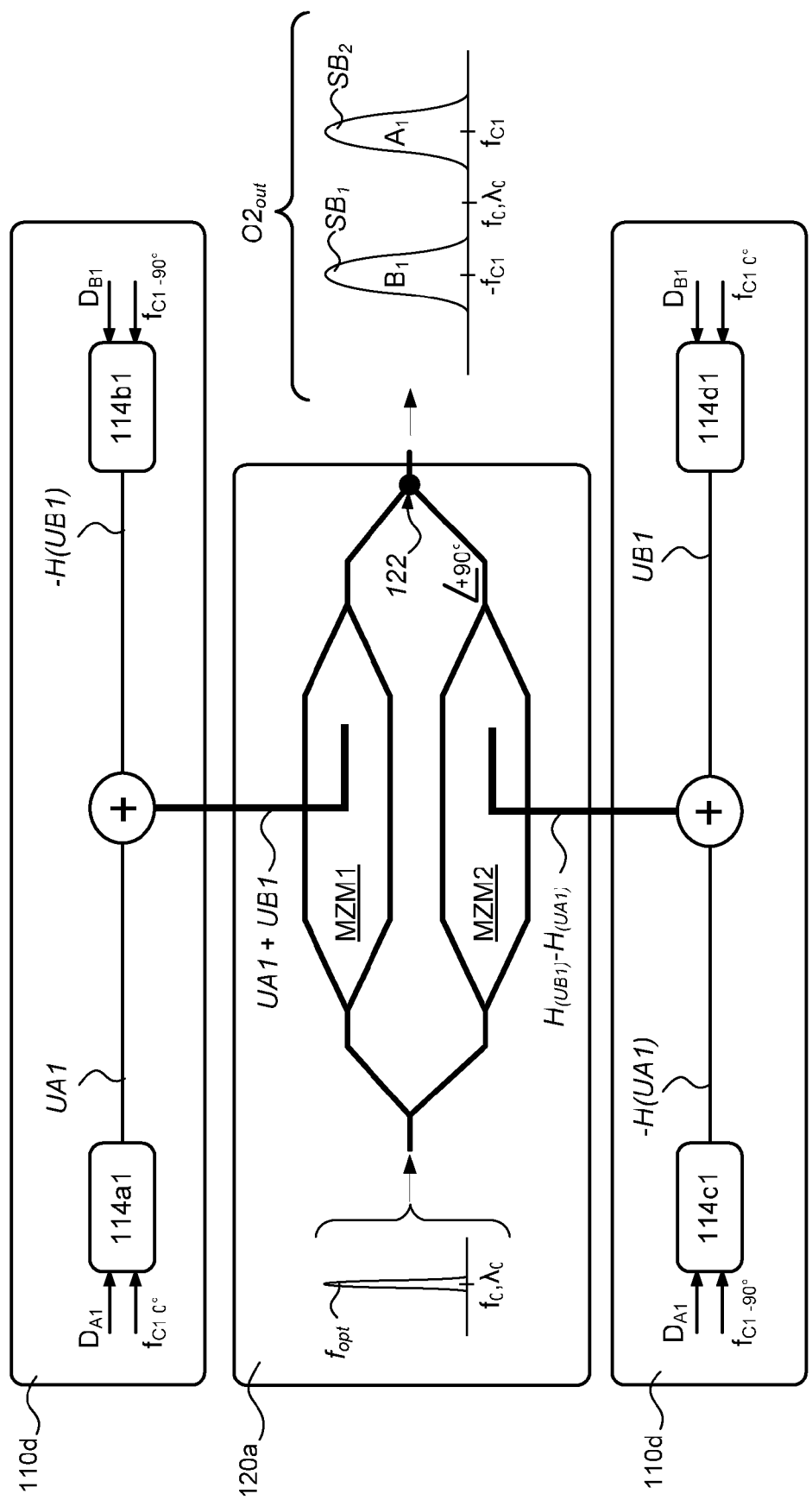
FIG. 2d is a schematic illustration of a third alternative signal generator arrangement 110c and the optical modulator arrangement 120a operating under a third alternative allocation scheme.

In alternative 4, which is schematically outlined in FIG. 2d, the optical carrier $f_{opt}$ is modulated in-phase with the first RF-signal UA1 and in quadrature with a first transform signal −H(UA1) representing a negative Hilbert transform of the first RF-signal UA so as to form an upper sideband $SB_2$ comprising the first set of data $A_1$. In addition, the optical carrier $f_{opt}$ is modulated in quadrature with the second RF-signal UB1 and in-phase with a second transform signal −H(UB1) representing a negative Hilbert transform of the second RF-signal UB1 so as to form a lower sideband $SB_1$ comprising the second set of data $B_1$. Here, the set of data in the two sidebands of the optical output signal $O2_{out}$ have changed place compared to alternative 1. To accomplish this, a third alternative signal generator arrangement 110d is used in alternative 4. The third alternative signal generator arrangement 110d is the same as the first signal generator arrangement 110a, except that the phase of the subcarrier $f_{C1}$ provided to the second mixer arrangement 114b1, the third mixer arrangement 114c1 and the fourth mixer arrangement 114d1 has been changed as indicated in FIG. 2d.

FIG. 2a shows some interior parts of the optical modulation arrangement 120a that may be affected when performing the actions and producing the signals etc discussed above.

As can be seen in FIG. 2a, it is preferred that the exemplifying optical modulator arrangement 120a comprises a first optical modulator MZM1 and a second optical modulator MZM2. The first optical modulator MZ1 and the second optical modulator MZM2 may be any suitable optical modulator or optical modulator arrangement. For example, the optical modulator arrangement 120a may comprise a dual drive Mach-Zehnder modulator or similar, or nested Mach-Zehnder modulators with four drive signals; one drive signal per Mach-Zehnder branch or similar. However, it is preferred that each of the first optical modulator MZM1 and the second optical modulator MZM2 are Mach-Zehnder Modulators (MZM). It is preferred that the first optical modulator MZ1 and the second optical modulator MZ2 are arranged in parallel, e.g. such that both modulators MZM1, MZM2 receive the same optical carrier $f_{opt}$, e.g. at an optical carrier input terminal or similar of the modulator in question. As can be seen in FIG. 2a it is preferred that the first optical modulator MZM1 is configured to modulate the optical carrier $f_{opt}$ in-phase (i.e. with a phase shift of 0°, and that the second optical modulator MZM2 is configured to modulate the optical carrier $f_{opt}$ in quadrature (e.g. with a phase shift of +90° or −90°) producing an optical output signal $O1_{out}$ or similar as indicated in FIGS. 2a and 2c. However, the converse may be equally applicable in embodiments of the present solution, i.e. the first optical modulator MZM1 may be configured to modulate the optical carrier $f_{opt}$ in quadrature, and that the second optical modulator MZM2 is configured to modulate the optical carrier $f_{opt}$ in-phase. If the converse is applied this will cause the set of data in the two sidebands SB1, SB2 to change place, e.g. as indicated by the optical output signal $O2_{out}$ in FIGS. 2b and 2d.

Figure 4:
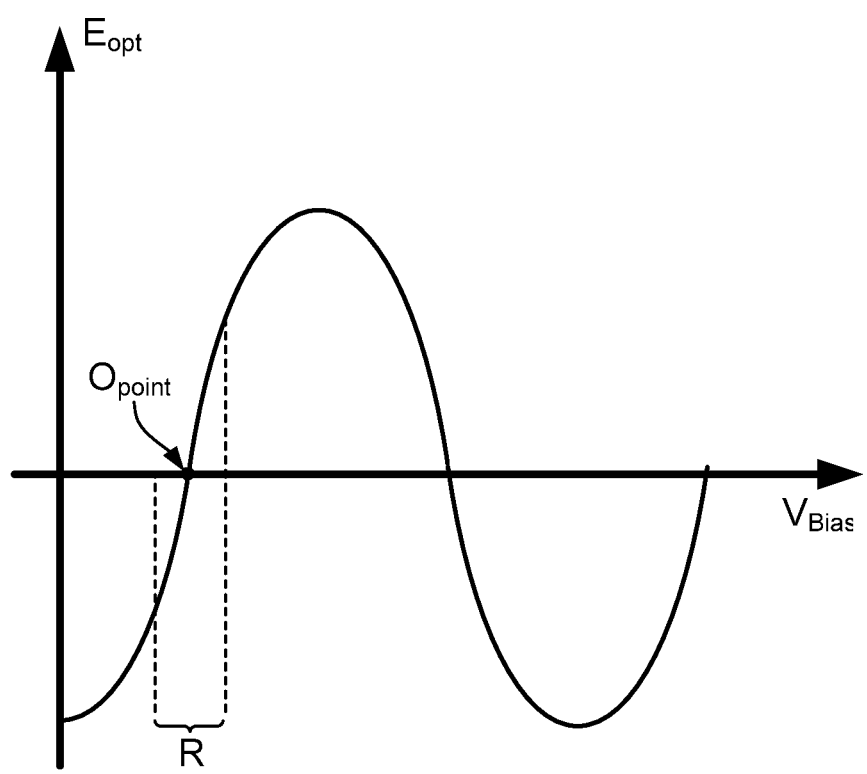
FIG. 4 is a schematic illustration of an exemplifying electro-optic transfer characteristic of an optical Mach Zehnder modulator.
Figure 5:
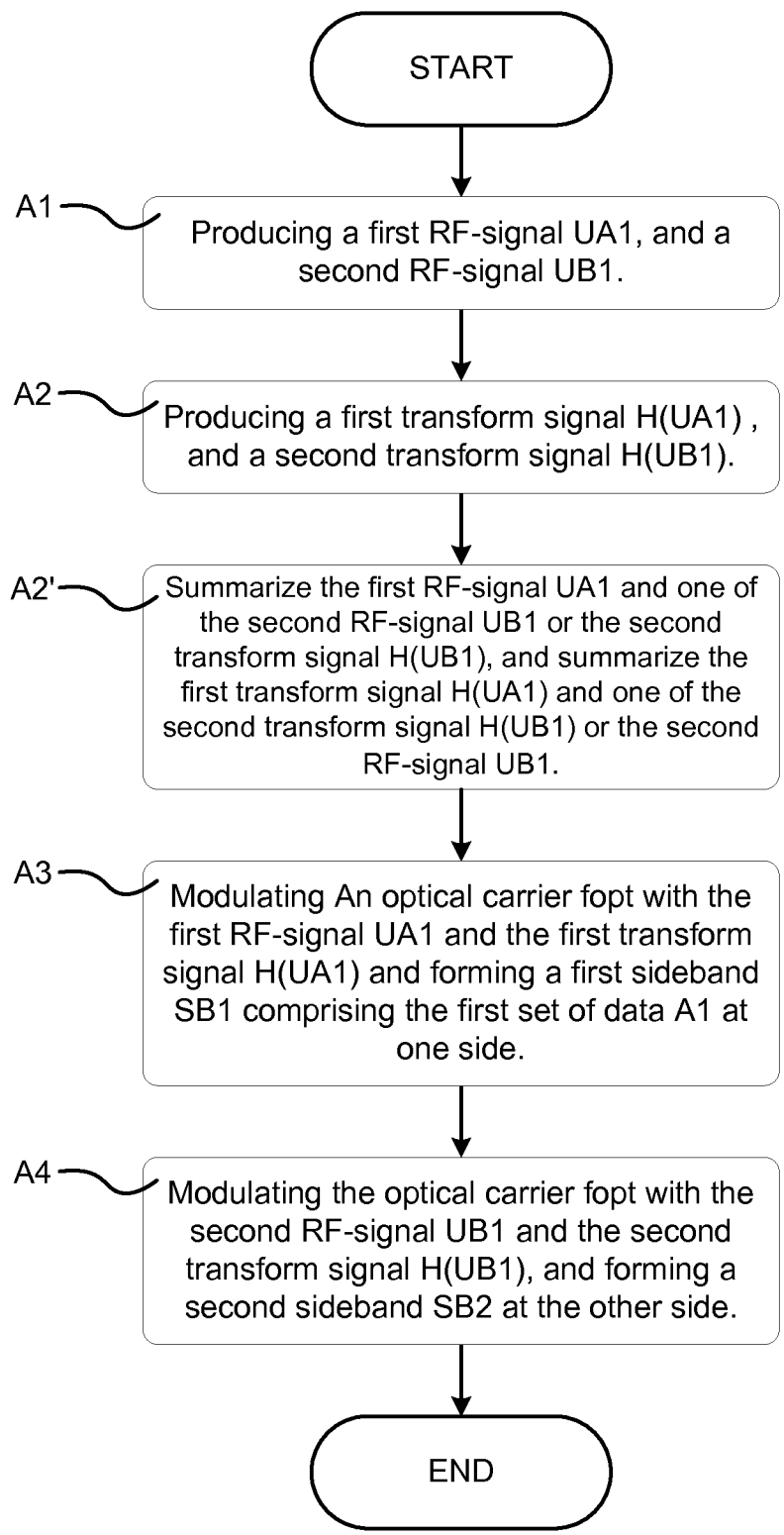
FIG. 5 is a schematic flowchart which illustrates the operation of exemplifying embodiments of the present solution.

It is preferred that the first optical modulator MZM1 and the second optical modulator MZM2 are configured such that the optical carrier $f_{opt}$ is suppressed in the output optical signal, e.g. suppressed in the output optical signal $O1_{out}$ or similar as illustrated in FIG. 2a. This may require that the operating point $O_{point}$ of the first optical modulator MZM1 is set in the linear range R of the first optical modulator MZM1, preferably in the middle of the in the linear range R, and that the operating point $O_{point}$ of the second optical modulator MZM2 is set in the linear range R of the second optical modulator MZM2, preferably in the middle of the in the linear range R. For example, it is well known by those skilled in the art that the electro-optic transfer characteristic of a Mach Zehnder modulator may be represented by a sine curve. This is clarified in FIG. 4 showing a schematic illustration of an exemplifying electro-optic transfer characteristic of a Mach Zehnder modulator. Thus, a Mach Zehnder modulator is preferably biased such that the operating point $O_{point}$ is set in a linear range R (preferably between the maximum and minimum of the curve representing the transfer characteristic). The modulating signal may then be superimposed onto the bias voltage.

It is preferred that optical modulator arrangement 120a comprises an optical combiner arrangement 122. The optical combiner arrangement 122 may be configured to operatively form the first sideband SB1 and the second sideband SB2 by combining the optical carrier $f_{opt}$ modulated with the first RF-signal UA1, and the optical carrier $f_{opt}$ modulated with the first transform signal H(UA1), and the optical carrier $f_{opt}$ modulated with the second RF-signal UB1, and the optical carrier $f_{opt}$ modulated with the second transform signal H(UB1). Note that the first transform signal H(UA1) may be positive +H(UA1) or negative −H(UA1), and the second transform signal H(UB1) may be positive +H(UB1) or negative −H(UB1), e.g. as indicated in FIGS. 2a-2d discussed above with reference to the example table.

The features and/or actions of various embodiments of the present solution have now been described either with reference to the signal generator arrangement or to the elector optical modulator arrangement. However, some features and/or actions described with reference to the signal generator arrangement may alternatively belong to the modulator arrangement. Conversely, some features and/or actions described with reference to the modulator arrangement may alternatively belong to the signal generator arrangement. Indeed, some embodiments of the present solution may have a signal generator arrangement and a modulator arrangement in a single intermixed unit or similar that can not be readily separated into a signal generator arrangement and a modulator arrangement. This may e.g. be the case when the optical transmitter arrangement 100 as a whole is implemented in an integrated circuit or similar.

The attention is now directed to the flowchart in FIG. 6 illustrating the operation of some exemplifying embodiments of the present solution.

In a first action A1 it is preferred that the first RF-signal UA1 is produced comprising the first set of data $A_1$ carried by the subcarrier $f_{C1}$ and that the second RF-signal UB1 is produced comprising the second set of data $B_1$ carried by the subcarrier $f_{C1}$.

As indicated above, the first RF-signal UA1 may be produced by modulating the subcarrier $f_{C1}$ with the first data signal $D_{A1}$ comprising the first set of data $A_1$, and the second RF-signal UB1 may be produced by modulating the subcarrier $f_{C1}$ with the second data signal $D_{B1}$ comprising the second set of data $B_1$.

In a second action A2 it is preferred that the first transform signal H(UA1) is produced in the form of a Hilbert Transform of the first RF-signal UA1, and that a second transform signal H(UB1) is produced in the form of a Hilbert Transform of the second RF-signal UB1. As previously indicated, the Hilbert transform may be positive or negative.

As also indicated above, the first transform signal H(UA1) may e.g. be produced by phase shifting the subcarrier $f_{C1}$ by 90° and then modulating the phase shifted subcarrier $f_{C1,90°}$ with the first data signal $D_{A1}$, and the second transform signal H(UB1) may be produced by phase shifting the subcarrier $f_{C1}$ by -90° and modulating the phase shifted subcarrier $f_{C1,90°}$ with the second data signal $D_{B1}$.

In a second sub-action A2' it is preferred that the first RF-signal UA1 and one of the second RF-signal UB1 or the second transform signal -H(UB1) are summarized before modulating the optical carrier $f_{opt}$. Similarly, the first transform signal H(UA1) and one of the second transform signal -H(UB1) or the second RF-signal UB1 are summarized before modulating the optical carrier $f_{opt}$.

In a third action A3 it is preferred that the optical carrier $f_{opt}$ is modulated with the first RF-signal UA1 and the first transform signal H(UA1). As indicated above, the optical carrier $f_{opt}$ modulated with the first RF-signal UA1 and with the first transform signal H(UA1) is then used to form the first sideband SB1 comprising the first set of data A1 at one side of the frequency $f_0$ of the optical carrier $f_{opt}$.

In a fourth action A4 it is preferred that the optical carrier $f_{opt}$ is modulated with the second RF-signal UB1 and the second transform signal -H(UB1). As indicated above, the optical carrier $f_{opt}$ modulated with the second RF-signal UB1 and with the second transform signal -H(UB1) is then used to form the second sideband SB2 comprising the second set of data A2 at the other side of the frequency $f_0$ of the optical carrier $f_{opt}$.

As indicated above, the optical carrier $f_{opt}$ may be modulated with the first RF-signal UA1 and the first transform signal H(UA1) such that the first RF-signal UA1 and the first transform signal H(UA1) are in quadrature with respect to each other. Similarly, the optical carrier $f_{opt}$ may be modulated with the second RF-signal UB1 and the second transform signal -H(UB1) such that the second RF-signal UB1 and the second transform signal -H(UB1) are in quadrature with respect to each other.

As indicated above, the optical carrier $f_{opt}$ may be modulated in-phase with the first F-signal UA1, and one of the second RF-signal (UB1) or the second transform signal H(UB1). Similarly, the optical carrier $f_{opt}$ may be modulated in quadrature with the first transform signal H(UA1) and one of the second transform signal -H(UB1) or the second RF-signal UB1.

As indicated above, the optical carrier $f_{opt}$ may be modulated in-phase by a first optical modulator MZM1 and in quadrature by a second optical modulator MZM2.

As indicated above, the first sideband SB1 and the second sideband SB2 are preferably formed by combining:

1) the optical carrier $f_{opt}$ modulated with the first RF-signal (UA1), and 2) the optical carrier ($f_{opt}$) modulated with the first transform signal (H(UA1)), and 3) the optical carrier ($f_{opt}$) modulated with the second RF-signal (UB1), and 4) the optical carrier ($f_{opt}$) modulated with the second transform signal (-H(UB1)).

In some embodiments, e.g. when creating an optical SCM output signal or similar, a first additional RF-signal UAn may be produced comprising a first additional set of data $A_n$ carried by an additional subcarrier $f_{Cn}$. Similarly, a second additional RF-signal UBn may be produced comprising a second additional set of data $B_n$ carried by the additional subcarrier $f_{C1}$. A first additional transform signal H(UAn) may also be produced in these embodiments, where the first additional transform signal H(UAn) is a Hilbert Transform of the first additional RF-signal UAn. Similarly, a second additional transform signal -H(UBn) may also be produced, where the where the second additional transform signal -H(UBn) is a Hilbert Transform of the second additional RF-signal UB1. In addition, in these embodiments the optical carrier $f_{opt}$ may be modulated with the first additional RF-signal UAn and the first additional transform signal H(UAn) and a first additional sideband $SB_3$ may be formed comprising the first additional set of data $A_n$ at one side of the frequency ($f_0$) of the optical carrier $f_{opt}$. Similarly, the optical carrier $f_{opt}$ may be modulated with the second additional RF-signal UBn and the second additional transform signal -H(UBn) and a second additional sideband $SB_4$ may be formed comprising the second additional set of data $B_n$ at the other side of the frequency $f_0$ of the optical carrier $f_{opt}$.

Some embodiments discussed above may be summarized in the following manner:

One embodiment may be directed to a method for allocating individual data in lower and upper sidebands in an optical signal Oout, O1out to be transmitted.

The method may comprise the actions of;
- producing a first RF-signal UA1 comprising a first set of data A1 carried by a subcarrier $f_{C1}$, and preferably a second RF-signal UB1 comprising a second set of data B1 carried by the subcarrier $f_{C1}$,
- producing a first transform signal H(UA1) being a Hilbert Transform of the first RF-signal UA1, and preferably a second transform signal -H(UB1) being a Hilbert Transform of the second RF-signal UB1,
- modulating the optical carrier fopt with the first RF-signal UA1 and the first transform signal H(UA1), and forming a first sideband SB1 comprising the first set of data A1 at one side of the frequency f0 of the optical carrier fopt, and
- preferably modulating the optical carrier fopt with the second RF-signal UB1 and the second transform signal -H(UB1), and forming a second sideband SB2 comprising the second set of data B1 at the other side of the frequency f0 of the optical carrier fopt.

It should be emphasised that the embodiment indicated above may produce only a first Single SideBand (SSB) comprising the first set of data A1, based on the first RF-signal UA1 and the first transform signal H(UA1). This has been indicated by the repeated use of the word "preferably". When only a first SSB is produced it is preferred that the first RF-signal UA1 is produced by modulating the subcarrier $f_{C1}$ with a first data signal DA1 comprising the first set of data A1, and that the first transform signal H(UA1) is produce by phase shifting the subcarrier $f_{C1}$ by 90° and then by modulating the phase shifted subcarrier $f_{C1,90°}$ with the first data signal DA1. The other embodiments described herein may be adapted mutatis mutandis such that only one SSB is produced.

The first RF-signal UA1, the second RF-signal UB1, the first transform signal H(UA1), and the second transform signal −H(UB1) may be electrical signals.

The first RF-signal UA1 may be produced by modulating the subcarrier $f_{C1}$ with a first data signal DA1 comprising the first set of data A1. The second RF-signal UB1 may be produced by modulating the subcarrier $f_{C1}$ with a second data signal DB1 comprising the second set of data B1. The first transform signal H(UA1) may be produce by phase shifting the subcarrier $f_{C1}$ by 90° and then modulating the phase shifted subcarrier $f_{C1,90°}$ with the first data signal DA1. The second transform signal −H(UB1) may be produced by phase shifting the subcarrier $f_{C1}$ by 90° and then modulating the phase shifted subcarrier $f_{C1,\ 90°}$ with the second data signal DB1.

The first RF-signal UA1, and one of the second RF-signal UB1 or the second transform signal H(UB1) may be summarized before modulating the optical carrier fopt. The first transform signal H(UA1), and one of the second transform signal H(UB1) or the second RF-signal UB1 may be summarized before modulating the optical carrier fopt.

The optical carrier fopt may be modulated with the first RF-signal UA1 and the first transform signal H(UA1) such that the first RF-signal UA1 and the first transform signal H(UA1) modulate the optical carrier fopt in quadrature with respect to each other. The optical carrier $f_{opt}$ may be modulated with second RF-signal UB1 and the second transform signal H(UB1) such that the second RF-signal UB1 and the second transform signal H(UB1) modulate the optical carrier fopt in quadrature with respect to each other.

The optical carrier fopt may be modulated in phase with the first RF-signal UA1, and one of the second RF-signal UB1 or the second transform signal H(UB1). The optical carrier fopt may be modulated in quadrature with the first transform signal H(UA1) and one of the second transform signal H(UB1) or the second RF-signal UB1.

The optical carrier fopt may be modulated in phase by a first optical modulator MZM1 and in quadrature by a second optical modulator MZM2. The first optical modulator MZM1 and the second optical modulator MZM2 are preferably comprised by the optical modulator arrangement 120a.

The first sideband SB1 and the second sideband SB2 may be formed by combining; the optical carrier fopt modulated with the first RF-signal UA1, and the optical carrier fopt modulated with the first transform signal H(UA1), and the optical carrier (fopt) modulated with the second RF-signal UB1, and the optical carrier fopt modulated with the second transform signal −H(UB1).

Some other embodiments discussed above may be summarized in the following manner:

One embodiment may be an optical transmitter arrangement 100 configured to transmit an optical signal with individual data allocated in lower and upper sidebands.

The optical transmitter arrangement 100 may comprise a signal generator arrangement 110a and an optical modulator arrangement 120a.

The signal generator arrangement 110a is configured to operatively produce a first RF-signal UA1 comprising a first set of data A1 carried by a subcarrier $f_{C1}$, and preferably a second RF-signal UB1 comprising a second set of data B1 carried by the subcarrier $f_{C1}$. It is also configured to operatively produce a first transform signal H(UA1) being a Hilbert Transform of the first RF-signal UA1, and preferably a second transform signal −H(UB1) being a Hilbert Transform of the second RF-signal UB1.

The optical modulator arrangement 120a is configured to operatively modulate an optical carrier fopt with the first RF-signal UA1 and the first transform signal H(UA1), and form a first sideband SB1 comprising the first set of data A1 at one side of the frequency f0 of the optical carrier fopt. Preferably the optical modulator arrangement 120a is also configured to operatively modulate the optical carrier fopt with the second RF-signal UB1 and the second transform signal −H(UB1), and form a second sideband SB2 comprising the second set of data B1 at the other side of the frequency f0 of the optical carrier fopt.

It should be emphasised that the embodiment indicated above may produce only a first Single SideBand (SSB) comprising the first set of data A1, based on the first RF-signal UA1 and the first transform signal H(UA1). This has been indicated by the repeated use of the word "preferably". When only a first SSB is produced it is preferred that the first RF-signal UA1 is produced by modulating the subcarrier $f_{C1}$ with a first data signal DA1 comprising the first set of data A1, and that the first transform signal H(UA1) is produce by phase shifting the subcarrier $f_{C1}$ by 90° and then by modulating the phase shifted subcarrier $f_{C1,90°}$ with the first data signal DA1. The other embodiments described herein may be adapted mutatis mutandis such that only one SSB is produced.

The signal generator arrangement may be configured to operatively produce the first RF-signal UA1, the second RF-signal UB1, the first transform signal H(UA1), and the second transform signal −H(UB1) as electrical signals.

The signal generator arrangement may be configured to operatively produce the first RF-signal UA1 by modulating the subcarrier $f_{C1}$ with a first data signal DA1 comprising the first set of data A1, and the second RF-signal UB1 by modulating the subcarrier $f_{C1}$ with a second data signal DB1 comprising the second set of data B1, and the first transform signal H(UA1) by phase shifting the subcarrier $f_{C1}$ by 90° and modulating the phase shifted subcarrier $f_{C1,90°}$ with the first data signal DA1, and the second transform signal H(UB1) by phase shifting the subcarrier $f_{C1}$ by 90° and modulating the phase shifted subcarrier $f_{C1,\ 90°}$ with the second data signal DB1.

The signal generator arrangement may be configured to operatively summarize the first RF-signal UA1 and one of the second RF-signal UB1 or the second transform signal H(UB1) before modulating the optical carrier fopt, and to summarize the first transform signal H(UA1) and one of the second transform signal H(UB1) or the second RF-signal UB1 before modulating the optical carrier fopt.

The optical modulator arrangement 120a may be configured to operatively modulate the optical carrier fopt with the first RF-signal UA1 and the first transform signal H(UA1) such that the first RF-signal UA1 and the first transform signal H(UA1) modulate the optical carrier fopt in quadrature with respect to each other, and to modulate the optical carrier fopt with the second RF-signal UB1 and the second transform signal H(UB1) such that the second RF-signal UB1 and the second transform signal H(UB1) modulate the optical carrier fopt in quadrature with respect to each other.

The optical modulator arrangement 120a may be configured to operatively modulate the optical carrier fopt in phase with the first RF-signal UA1 and one of the second RF-signal UB1 or the second transform signal H(UB1), and to modulate the optical carrier fopt in quadrature with the first transform signal H(UA1) and one of the second transform signal H(UB1) or the second RF-signal UB1.

The optical modulator arrangement 120a may comprise a first optical modulator MZM1 configured to operatively modulate the optical carrier fopt in phase, and a second optical modulator MZM2 configured to operatively modulate the optical carrier fopt in quadrature.

The optical modulator arrangement 120a may be configured to operatively form the first sideband SB1 and the second sideband SB2 by combining the optical carrier fopt modulated with the first RF-signal UA1, and the optical carrier fopt modulated with the first transform signal H(UA1), and the optical carrier fopt modulated with the second RF-signal UB1, and the optical carrier fopt modulated with the second transform signal −H(UB1).

The present invention has now been described with reference to exemplifying embodiments. However, the invention is not limited to the embodiments described herein. On the contrary, the full extent of the invention is only determined by the scope of the appended claims.

The invention claimed is:

1. A method for allocating individual data in lower and upper sidebands in an optical signal to be transmitted, comprising:
producing a first RF signal comprising a first set of data carried by a subcarrier, and a second RF signal comprising a second set of data carried by the subcarrier;
producing a first transform signal being a Hilbert Transform of the first RF signal, and a second transform signal being a Hilbert Transform of the second RF signal;
modulating an optical carrier with the first RF signal and the first transform signal; and
modulating the optical carrier with the second RF signal and the second transform signal; and
forming a first sideband and a second sideband, wherein the first sideband comprises the first set of data at one side of the frequency of the optical carrier and the second sideband comprises the second set of data at the other side of the frequency of the optical carrier, thereby forming a modulated optical signal that carries the first set of data in the first sideband at one side of the frequency of the optical carrier and the second set of data in the second sideband at the other side of the frequency of the optical carrier.

2. The method according to claim 1, wherein the first RF signal, the second RF signal, the first transform signal, and the second transform signal are electrical signals.

3. The method according to claim 1, further comprising:
producing the first RF signal by modulating the subcarrier with a first data signal comprising the first set of data;
producing the second RF signal by modulating the subcarrier with a second data signal comprising the second set of data;
producing the first transform signal by phase shifting the subcarrier by 90° and modulating the phase shifted subcarrier with the first data signal; and
producing the second transform signal by phase shifting the subcarrier by 90° and modulating the phase shifted subcarrier with the second data signal.

4. The method according to claim 1, further comprising:
summarizing the first RF signal, and one of the second RF signal or the second transform signal before modulating the optical carrier; and
summarizing the first transform signal, and one of the second transform signal or the second RF signal before modulating the optical carrier.

5. The method according to claim 1, further comprising:
modulating the optical carrier with the first RF signal and the first transform signal such that the first RF signal and the first transform signal modulate the optical carrier in quadrature with respect to each other, and
modulating the optical carrier with the second RF signal and the second transform signal such that the second RF signal and the second transform signal modulate the optical carrier in quadrature with respect to each other.

6. The method according to claim 5, wherein the optical carrier is modulated in phase by a first optical modulator and in quadrature by a second optical modulator.

7. The method according to claim 1, further comprising:
modulating the optical carrier in phase with the first RF signal, and one of the second RF signal or the second transform signal, and
modulating the optical carrier in quadrature with the first transform signal and one of the second transform signal or the second RF signal.

8. The method according to claim 1, wherein forming the sidebands comprises combining the optical carrier modulated with the first RF signal, the optical carrier modulated with the first transform signal, the optical carrier modulated with the second RF signal, and the optical carrier modulated with the second transform signal, wherein the combining comprises adding (i) the optical carrier modulated with the first RF signal and (ii) the optical carrier modulated with the second RF signal, and comprises adding (iii) the optical carrier modulated with the first transform signal, and (iv) the optical carrier modulated with the second transform signal.

9. The method according to claim 1, further comprising:
producing a first additional RF signal comprising a first additional set of data carried by an additional subcarrier, and a second additional RF signal comprising a second additional set of data carried by the additional subcarrier,
producing a first additional transform signal being a Hilbert Transform of the first additional RF signal, and a second additional transform signal being a Hilbert Transform of the second additional RF signal,
modulating the optical carrier with the first additional RF signal and the first additional transform signal and forming a first additional sideband comprising the first additional set of data at one side of the frequency of the optical carrier, and
modulating the optical carrier with the second additional RF signal and the second additional transform signal and forming a second additional sideband comprising the second additional set of data at the other side of the frequency of the optical carrier.

10. An optical transmitter configured to transmit an optical signal with individual data allocated in lower and upper sidebands, comprising:
a signal generator arrangement configured to operatively produce a first RF signal comprising a first set of data carried by a subcarrier, and a second RF signal comprising a second set of data carried by the subcarrier, and a first transform signal being a Hilbert Transform of the first RF signal, and a second transform signal being a Hilbert Transform of the second RF signal; and
an optical modulator arrangement configured to operatively modulate an optical carrier with the first RF signal and the first transform signal and form a first sideband and to modulate the optical carrier with the second RF signal and the second transform signal and form a second sideband, wherein the first sideband comprises the first set of data at one side of the frequency of the optical carrier, and the second sideband comprises the second set of data at the other side of the frequency of the optical carrier, to form a modulated optical signal that carries the first set of data in the first sideband at one side of the frequency of the optical carrier and the second set of data in the second sideband at the other side of the frequency of the optical carrier.

11. The optical transmitter according to claim 10, wherein the signal generator arrangement is configured to operatively produce the first RF signal, the second RF signal, the first transform signal, and the second transform signal as electrical signals.

12. The optical transmitter according to claim 10, wherein:
the signal generator arrangement is configured to operatively produce the first RF signal by modulating the subcarrier with a first data signal comprising the first set of data, and the second RF signal by modulating the subcarrier with a second data signal comprising the second set of data, and the first transform signal by phase shifting the subcarrier by 90° and modulating the phase shifted subcarrier with the first data signal, and the second transform signal by phase shifting the subcarrier by 90° and modulating the phase shifted subcarrier with the second data signal.

13. The optical transmitter according to claim 10, wherein: the signal generator arrangement is configured to operatively summarize the first RF signal and one of the second RF signal or the second transform signal before modulating the optical carrier, and summarize the first transform signal and one of the second transform signal or the second RF signal before modulating the optical carrier.

14. The optical transmitter according to claim 13, wherein: the optical modulator arrangement comprises a first optical modulator configured to operatively modulate the optical carrier in phase, and a second optical modulator configured to operatively modulate the optical carrier in quadrature.

15. The optical transmitter according to claim 10, wherein: the optical modulator arrangement is configured to operatively modulate the optical carrier with the first RF signal and the first transform signal such that the first RF signal and the first transform signal modulate the optical carrier in quadrature with respect to each other, and to modulate the optical carrier with the second RF signal and the second transform signal such that the second RF signal and the second transform signal modulate the optical carrier in quadrature with respect to each other.

16. The optical transmitter according to claim 10, wherein: the optical modulator arrangement is configured to operatively modulate the optical carrier in phase with the first RF signal and one of the second RF signal or the second transform signal, and to modulate the optical carrier in quadrature with the first transform signal and one of the second transform signal or the second RF signal.

17. The optical transmitter according to claim 10, wherein: the optical modulator arrangement is configured to operatively form the sidebands by combining the optical carrier modulated with the first RF signal, the optical carrier modulated with the first transform signal, the optical carrier modulated with the second RF signal, and the optical carrier modulated with the second transform signal, wherein the optical modulator arrangement is configured to combine the signals by adding (i) the optical carrier modulated with the first RF signal and (ii) the optical carrier modulated with the second RF signal, and comprises adding (iii) the optical carrier modulated with the first transform signal, and (iv) the optical carrier modulated with the second transform signal.

18. The optical transmitter according to claim 10, wherein:
the signal generator arrangement is configured to operatively produce a first additional RF signal comprising a first additional set of data carried by an additional subcarrier, and a second additional RF signal comprising a second additional set of data carried by the additional subcarrier, and a first additional transform signal being a Hilbert Transform of the first additional RF signal, and a second additional transform signal being a Hilbert Transform of the second additional RF signal, and
the optical modulator arrangement is configured to operatively modulate the optical carrier with the first additional RF signal and the first additional transform signal and form a first additional sideband comprising the first additional set of data at one side of the frequency of the optical carrier, and to modulate the optical carrier with the second additional RF signal and the second additional transform signal and form a second additional sideband comprising the second additional set of data at the other side of the frequency of the optical carrier.

\* \* \* \* \*

UNITED STATES PATENT AND TRADEMARK OFFICE
CERTIFICATE OF CORRECTION

PATENT NO. : 9,258,061 B2  
APPLICATION NO. : 14/128082  
DATED : February 9, 2016  
INVENTOR(S) : Olsson et al.

Page 1 of 1

It is certified that error appears in the above-identified patent and that said Letters Patent is hereby corrected as shown below:

On the Title Page, below Title, in Column 1, insert -- (71) Applicant: Telefonaktiebolaget L M Ericsson (publ), Stockholm (SE) --.

On the Title Page, in Column 1, delete Item "(75)" and insert Item -- (72) --, therefor.

In Column 13, Line 66, delete "$f_{opt}$" and insert -- ($f_{opt}$) --, therefor.

Signed and Sealed this  
Seventh Day of June, 2016

Michelle K. Lee  
*Director of the United States Patent and Trademark Office*